US011155329B2

(12) United States Patent
Mokhtarian

(10) Patent No.: US 11,155,329 B2
(45) Date of Patent: Oct. 26, 2021

(54) VARIABLE CAMBER SYSTEM

(71) Applicant: Bombardier Inc., Dorval (CA)

(72) Inventor: Farzad Mokhtarian, Baie D'urfe (CA)

(73) Assignee: Bombardier Inc.

( * ) Notice: Subject to any disclaimer, the term of this patent is extended or adjusted under 35 U.S.C. 154(b) by 193 days.

(21) Appl. No.: 16/447,143

(22) Filed: Jun. 20, 2019

(65) Prior Publication Data

US 2019/0389558 A1 Dec. 26, 2019

Related U.S. Application Data

(60) Provisional application No. 62/687,558, filed on Jun. 20, 2018.

(51) Int. Cl.
| | |
|---|---|
| *B64C 3/50* | (2006.01) |
| *B64C 9/06* | (2006.01) |
| *B64C 9/12* | (2006.01) |
| *B64C 9/14* | (2006.01) |
| *B64C 13/34* | (2006.01) |

(52) U.S. Cl.
CPC ............... *B64C 3/50* (2013.01); *B64C 9/06* (2013.01); *B64C 9/12* (2013.01); *B64C 9/14* (2013.01); *B64C 13/34* (2013.01)

(58) Field of Classification Search
CPC .... B64C 3/50; B64C 9/06; B64C 9/12; B64C 9/14; B64C 13/34
See application file for complete search history.

(56) References Cited

U.S. PATENT DOCUMENTS

| | | |
|---|---|---|
| 2,261,363 A | 11/1941 | Griswold |
| 2,419,161 A | 4/1947 | Pitt |
| 2,624,532 A | 1/1953 | Butler |
| 2,772,058 A | 11/1956 | Grant |
| 3,092,354 A | 6/1963 | Alvarez-Calderon |
| 3,767,140 A | 10/1973 | Johnson |
| 4,015,787 A | 4/1977 | Maieli et al. |
| 4,784,355 A | 11/1988 | Brine |
| 6,328,265 B1 | 12/2001 | Dizdarevic |
| 7,059,563 B2 | 6/2006 | Huynh |
| 8,684,316 B2 | 4/2014 | Sakurai et al. |
| 9,193,440 B2 | 11/2015 | Moser et al. |

(Continued)

FOREIGN PATENT DOCUMENTS

| | | |
|---|---|---|
| EP | 0937642 A2 | 8/1999 |
| EP | 2690006 A2 | 1/2014 |

OTHER PUBLICATIONS

European Search Report for EP19181075.3, dated Nov. 14, 2019.
(Continued)

*Primary Examiner* — Rodney A Bonnette
(74) *Attorney, Agent, or Firm* — Fishman Stewart PLLC

(57) ABSTRACT

A variable camber system for an aircraft wing including a wing bracket extending downward from a wing, a flap bracket pivotably coupled to the wing bracket, and a flap pivotably coupled to the flap bracket such that the flap pivots around an axis of rotation through the flap. The variable camber system is configured to adjust position of both the flap and the flap bracket relative to the wing while maintaining position of the flap relative to the flap bracket. The variable camber system is also configured to adjust position of the flap relative to the flap bracket.

20 Claims, 8 Drawing Sheets

(56) References Cited

U.S. PATENT DOCUMENTS

| | | | | |
|---|---|---|---|---|
| 2015/0083852 A1* | 3/2015 | Moser | ..................... | B64C 9/14 |
| | | | | 244/99.3 |
| 2015/0088340 A1* | 3/2015 | Moser | ..................... | B64C 9/16 |
| | | | | 701/3 |
| 2015/0102166 A1* | 4/2015 | Moser | ................... | B64C 13/34 |
| | | | | 244/110 D |
| 2015/0105945 A1* | 4/2015 | Moser | ................ | B64C 13/0425 |
| | | | | 701/3 |
| 2015/0291275 A1 | 10/2015 | Bastiaansen et al. | | |
| 2019/0389561 A1* | 12/2019 | Mokhtarian | .............. | B64C 9/18 |
| 2020/0047874 A1* | 2/2020 | Bowers | ................... | B64C 3/50 |

OTHER PUBLICATIONS

Fassi et al., "Development of High-Lift Systems for the Bombardier CRJ-700" 23rd International Congress of Aeronautical Sciences, Sep. 13, 2002.

European Search Report for EP19181074.6, dated Nov. 8, 2019.

\* cited by examiner

VARIABLE CAMBER SYSTEM

CROSS REFERENCE TO RELATED APPLICATIONS

This application claims the benefit of U.S. Provisional Application Ser. No. 62/687,558 filed on Jun. 20, 2018. Further, the U.S. Provisional Application Ser. No. 62/687,558 is incorporated herein by reference in its entirety.

FIELD OF TECHNOLOGY

An improved variable camber system for an aircraft wing is disclosed. Improvements are applicable to business and commercial aircraft that employ variable camber systems.

BACKGROUND

Variable camber systems are often used in aircraft to change the curvature (camber) of the main airfoil. Such systems are often complex and require the use of differential gear boxes and clutches between inboard and outboard panels. To further add to the complexities, differential flap positioning between left and right wings, such as for roll and trim, often require independent left and right power drive units (PDUs). Additional failure scenarios and certification risks are often associated with these differential gear boxes, clutches, and additional PDUs.

In addition to the added complexities that often come with variable camber systems, many variable camber systems also often require frequent adjustment of spoiler and/or bent-up trailing edge (BUTE) door positions. Many variable camber systems entail flap adjustments that employ forward or back flap adjustments with each up or down adjustment. In such systems, the distance between spoiler and flap as well as the distance between BUTE door and flap change with each flap adjustment. As such, spoiler and BUTE door adjustments are frequently made to keep these distances constant.

Thus, there is a need to create variable camber systems that minimize complexities and/or the need for flap and BUTE door adjustments.

DETAILED DESCRIPTION

Figure 1:
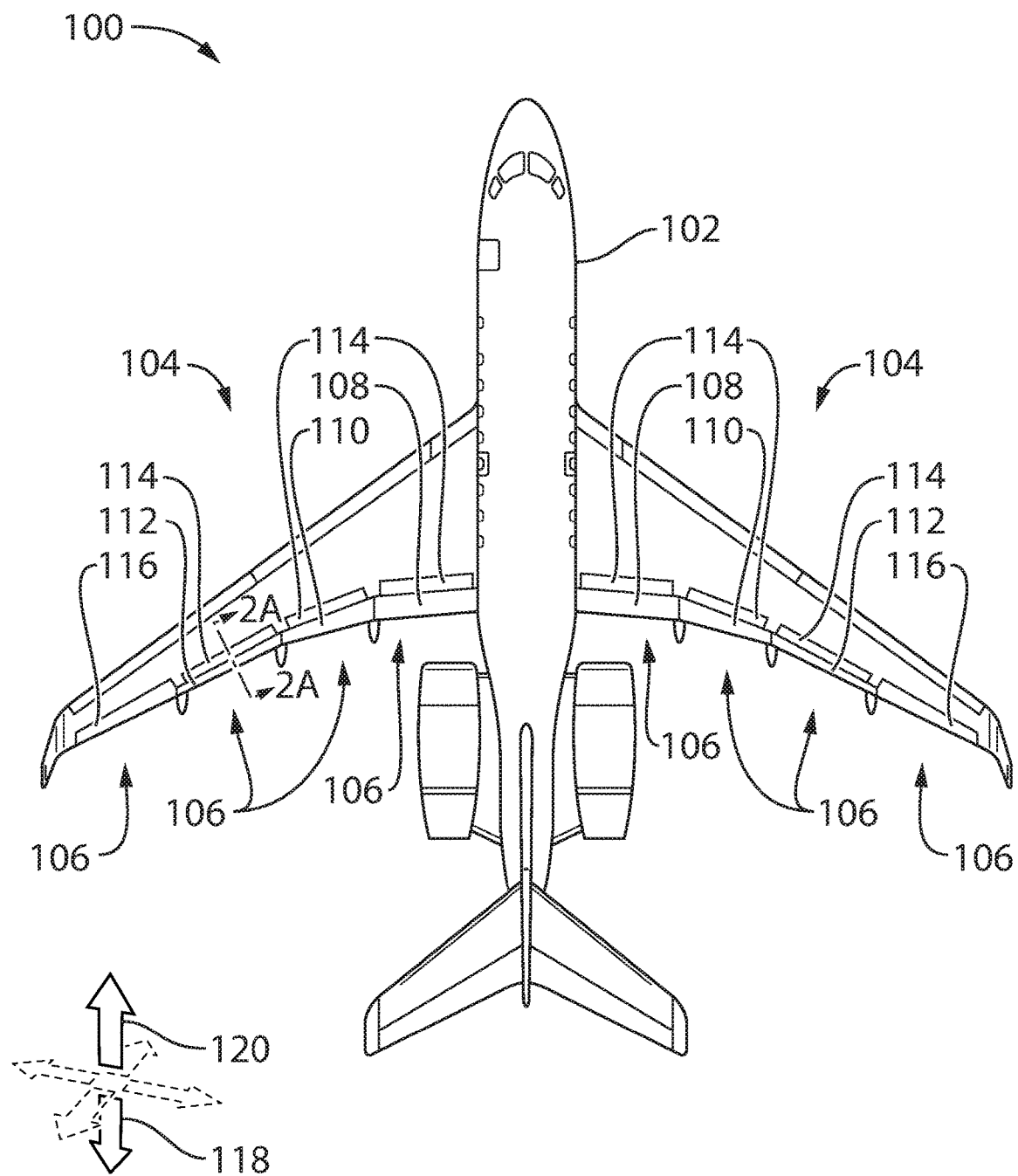
FIG. 1 illustrates an exemplary aircraft.

FIG. 1 illustrates a perspective view of an exemplary aircraft 100. As illustrated, the aircraft 100 includes a passenger cabin 102 having a pair of wings 104 extending therefrom. The wings 104 include exemplary trailing edge devices 106. These trailing edge devices 106 of each wing 104 include an inboard variable-camber flap system 108, a mid variable-camber flap 110 system and an outboard variable-camber flap system 112. Exemplary spoilers 114 and ailerons 116 are also illustrated.

The flap systems 108-112 may be employed for a variety of flight scenarios. For example, each of the flap systems 108-112 may be moved in a downward direction 118 to increase drag or lift. Further, if one or more of the flap systems 108-112 functions as a flaperon, the one or more flap systems 108-112 may move in an upward direction 120 to, for example, decrease lift and/or improve lateral stability. These flap systems 108-112 may function in groups to work in unison. Alternatively, one or more of the flap systems 108-112 may work independently of one another.

Figure 2A:
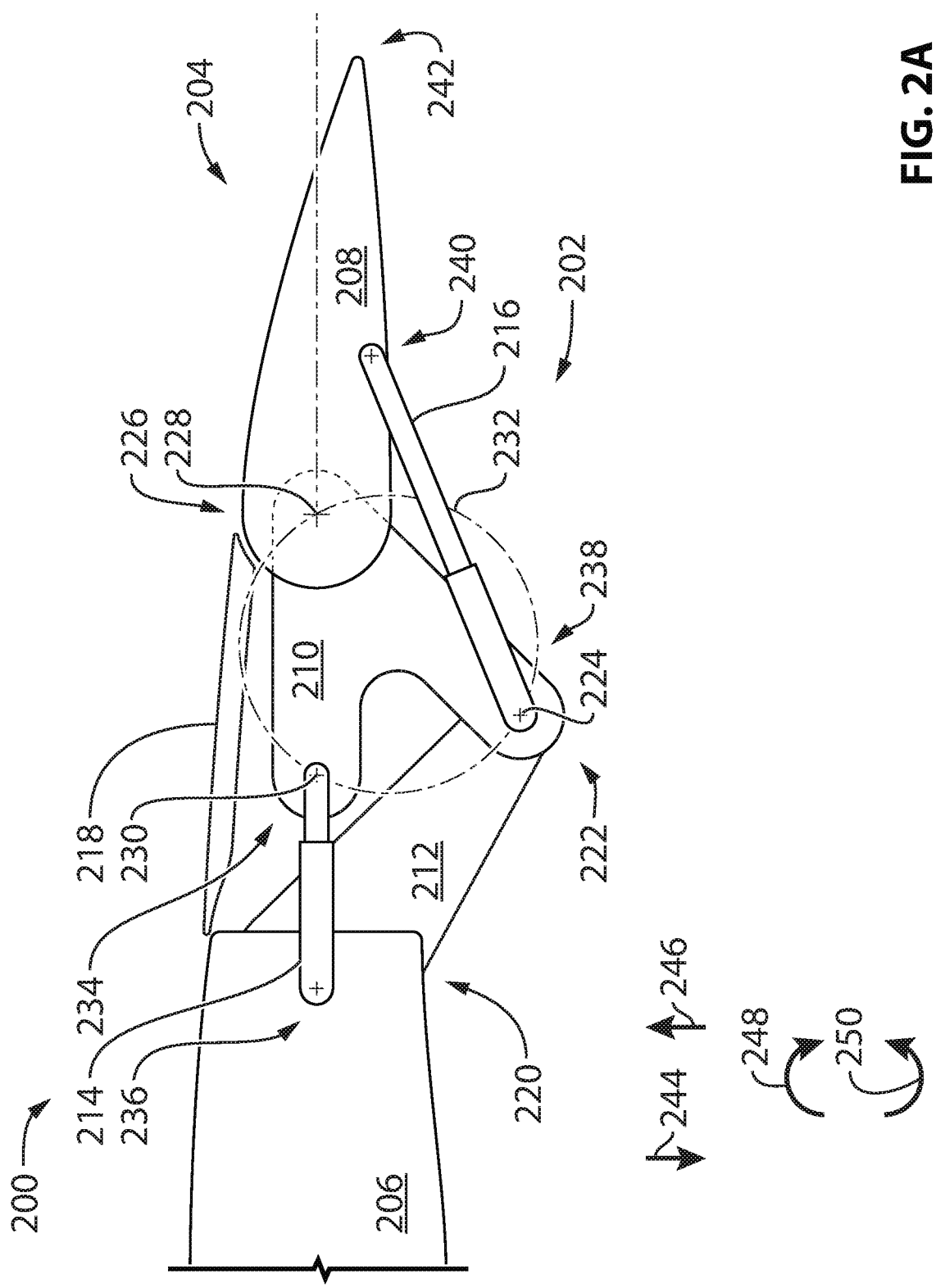
FIG. 2A illustrates a cross-sectional view of a portion of the wing system of FIG. 1.

FIG. 2A illustrates a cross-sectional view of a wing system 200 along 2A-2A of FIG. 1. As illustrated in FIG. 2A, a variable-camber flap system 202 is shown in a first position 204 coupled to a wing portion 206. While the variable camber flap system 202 along 2A-2A of FIG. 1 is an outboard system 110, exemplary systems such as the variable-camber flap system 202 may also be employed in inboard and mid scenarios (e.g., inboard variable-camber flap system 108 and mid variable camber flap system of FIG. 1).

Referring back to FIG. 2A, the variable camber flap system 202 includes a flap 208, a flap bracket 210, a wing bracket 212, a first actuator 214, and a second actuator 216. The variable camber flap system 202 may also include a spoiler 218. Further, though not shown, the variable camber flap system 202 may also include a bent-up leading edge (BUTE) door. An exemplary BUTE door and another exemplary spoiler will be set forth below with respect to FIGS. 3A-3C.

It is noted that the position of the spoiler 218 shown in FIGS. 2A-2D is exemplary, and that other positions (e.g., extended or contracted) are contemplated.

Referring back to FIG. 2A, in the example shown, the wing bracket 212 extends downward from the wing portion 206. Other exemplary wing brackets 212, however, may not extend downward from the wing portion 206. Nonetheless, the wing bracket 212 has a first end 220 and a second end 222 opposite the first end 220. The first end 220 of the wing bracket 212 is coupled to the wing portion 206. The second end 222 of the wing bracket 212 is pivotably coupled to the flap bracket 210 at a first pivot point or region 224 of the flap bracket 210. The flap bracket 210 is also pivotably coupled to a windward end 226 of the flap 208 at a second pivot point or region 228 and to the first actuator 214 at a third pivot point or region 230. While the flap bracket 210 illustrated in FIG. 2A is lobed, other examples may employ a flap bracket having a different shape. For example, as shown in phantom, a circular flap bracket 232 having three pivot regions 224, 228, 230 could be used. Further, though not shown, alternate shapes of other components discussed herein may be employed.

Referring back to the lobed flap bracket 210, the third pivot region 230 is coupled to one end (a flap bracket end) 234 of the first actuator 214. The other end (wing end) 236 of the first actuator 214 is pivotably coupled to the wing portion 206. Though not shown, the wing end 236 of the first actuator 214 could alternatively be coupled to the wing bracket 212 or to a combination of the wing portion 206 and the wing bracket 212.

Still referring to FIG. 2A, a flap bracket end 238 of the second actuator 216 is pivotably coupled to the flap bracket 210 at the first pivot point 224 and a flap end 240 of the second actuator 216 is pivotably coupled to the flap 208 at the second pivot point 228 of the flap bracket 210.

The first and second actuators 214, 216 are employed to move a trailing edge 242 of the flap 208 in a downward 244 or an upward 246 direction. For example, when the first actuator 214 is caused to lengthen, the flap bracket 210 and flap 208 pivot or rotate together in a clockwise direction 248 (from the perspective of FIG. 2A) around the first pivot point 224. As such, the trailing edge or end 242 moves in the downward direction 244. Alternatively, when the first actuator 214 is caused to shorten, the flap bracket 210 and flap 208 rotate together in a counterclockwise direction 250 around the first pivot point 224 such that the trailing edge 242 moves in the upward direction 246. By adjusting the first actuator 214 (expansion or contraction), the variable-camber flap system 202 is able to adjust position of both the flap 208 and flap bracket 210 relative to the wing portion 206 while maintaining the position of the flap 208 relative to the flap bracket 210.

In contrast, when the second actuator 216 is caused to lengthen, the flap 208 pivots or rotates in the counterclockwise direction 250 around the second pivot point 228. In other words, lengthening the second actuator 216 causes the flap 208 to rotate in the counterclockwise direction 250 with respect to the flap bracket 210. As such, the trailing edge 242 of the flap 208 moves in the upward direction 246.

Shortening the second actuator 216, on the other hand, causes the flap 208 to rotate in the clockwise direction 248 about the second pivot point 228. As such, the trailing edge 242 of the flap 208 moves in the downward direction 244 when the second actuator 216 is shortened.

As described above, by adjusting the second actuator 216 (expansion or contraction), the variable-camber flap system 202 is configured to adjust position of the flap 208 relative to the flap bracket 210.

It is noted that the first and second actuators 214, 216, respectively, can lengthen and/or contract simultaneously or at different times. Effectively, the first pivot point 224 serves as an axis of rotation for the combination of the flap 208 and flap bracket 210 in relation to the wing bracket 212. As such, the variable-camber system 202 can cause rotation of both the flap 208 and the flap bracket 210 about the first pivot point 224 (axis of rotation) as the flap 208 remains stationary relative to the flap bracket 210

The second pivot point 228, on the other hand, serves as an axis of rotation for the flap 208 relative to the flap bracket 210. As such, the variable camber system 202 is configured to cause rotation of the flap 208 about the second pivot point 228 as the flap bracket 210 remains stationary relative to the wing bracket 212.

These actuators 214, 216 may, for example, be linear-type actuators such as screwjack-type actuators. Other types, however, may be employed. Further, the first actuator 214 need not be the same type of actuator as the second actuator 216.

Figure 2B:
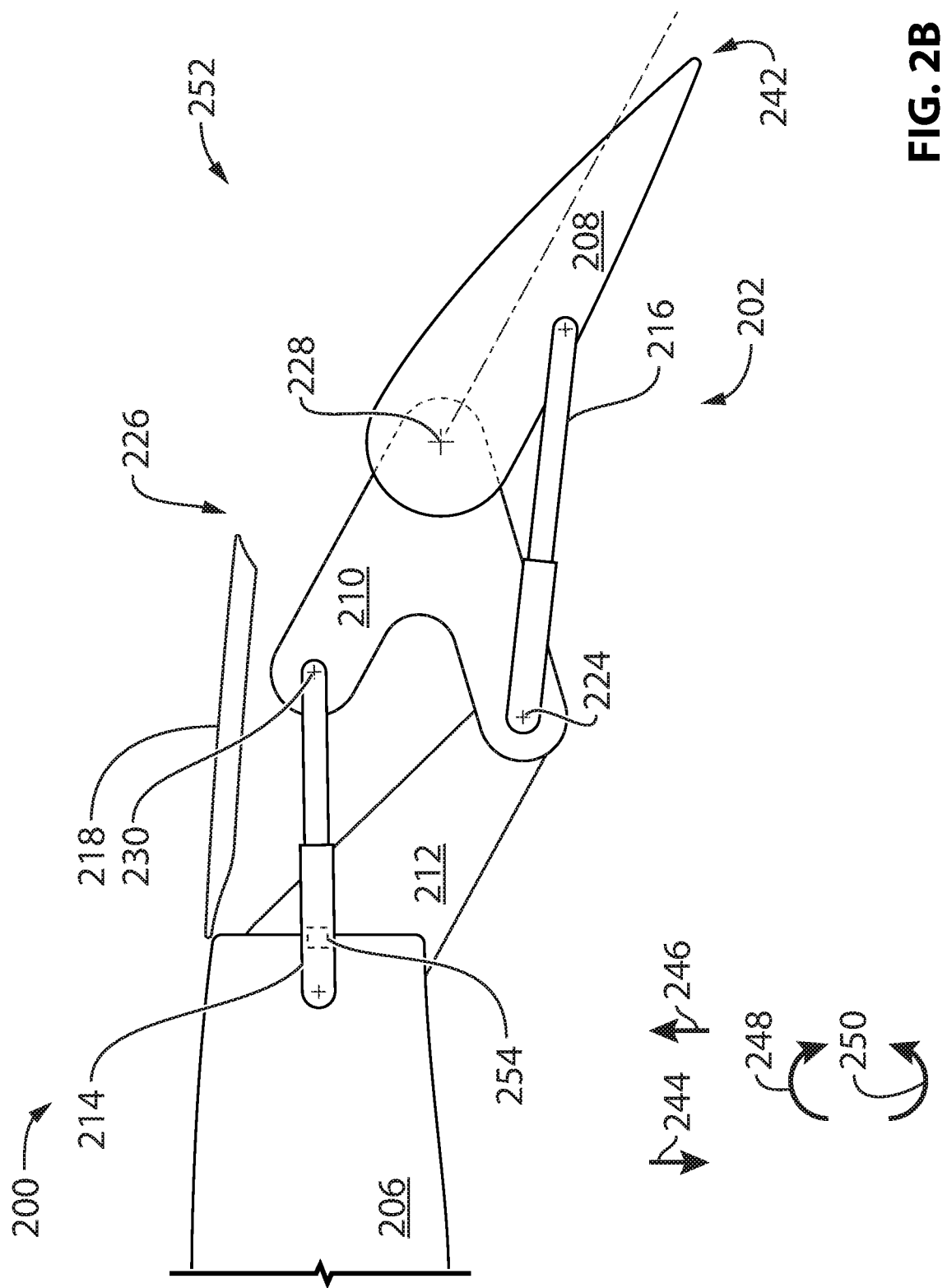
FIG. 2B illustrates the exemplary variable camber system of FIG. 2A in a second position.
Figure 2C:
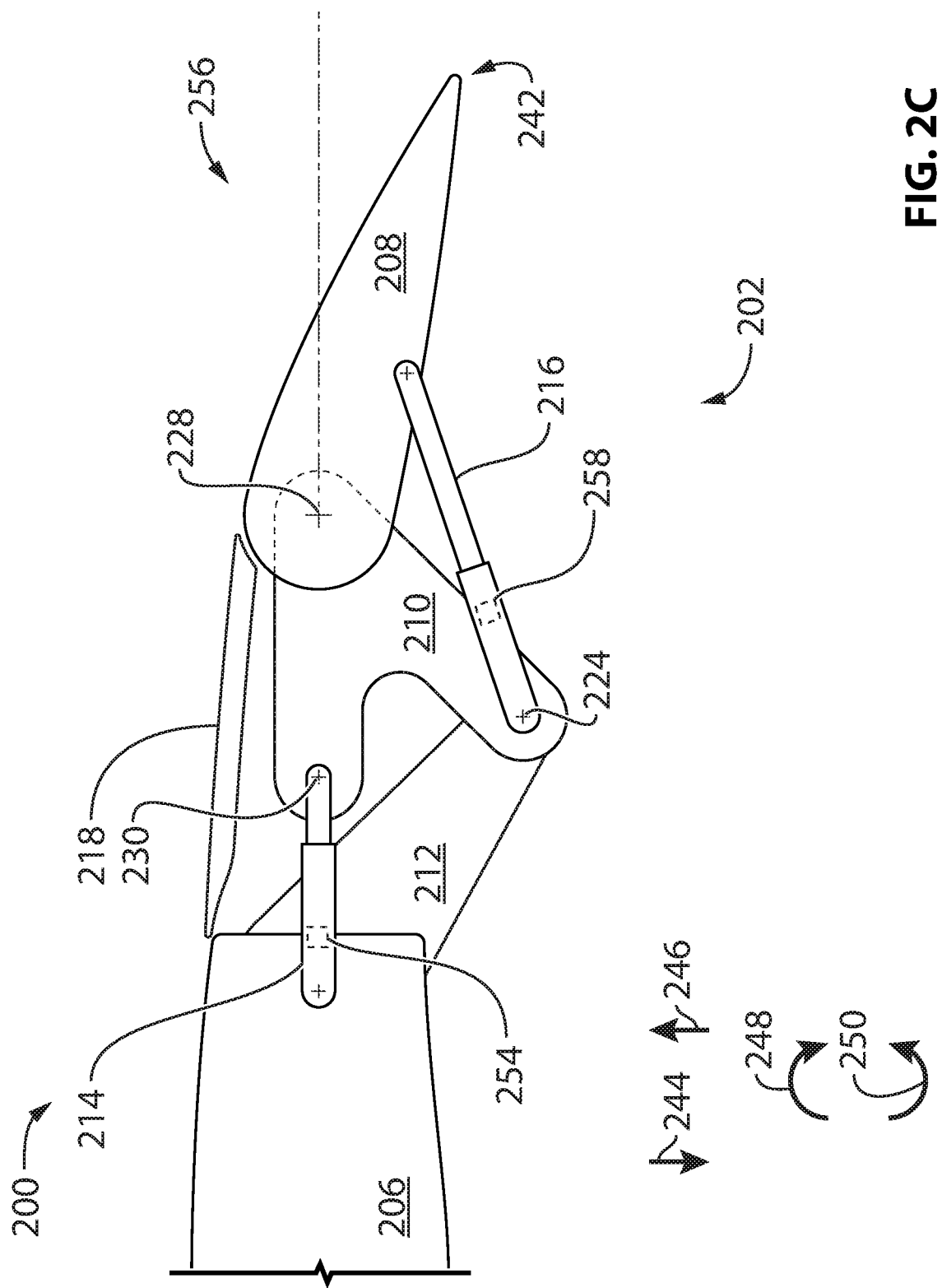
FIG. 2C illustrates the exemplary variable camber system of FIG. 2A in a third position.
Figure 2D:
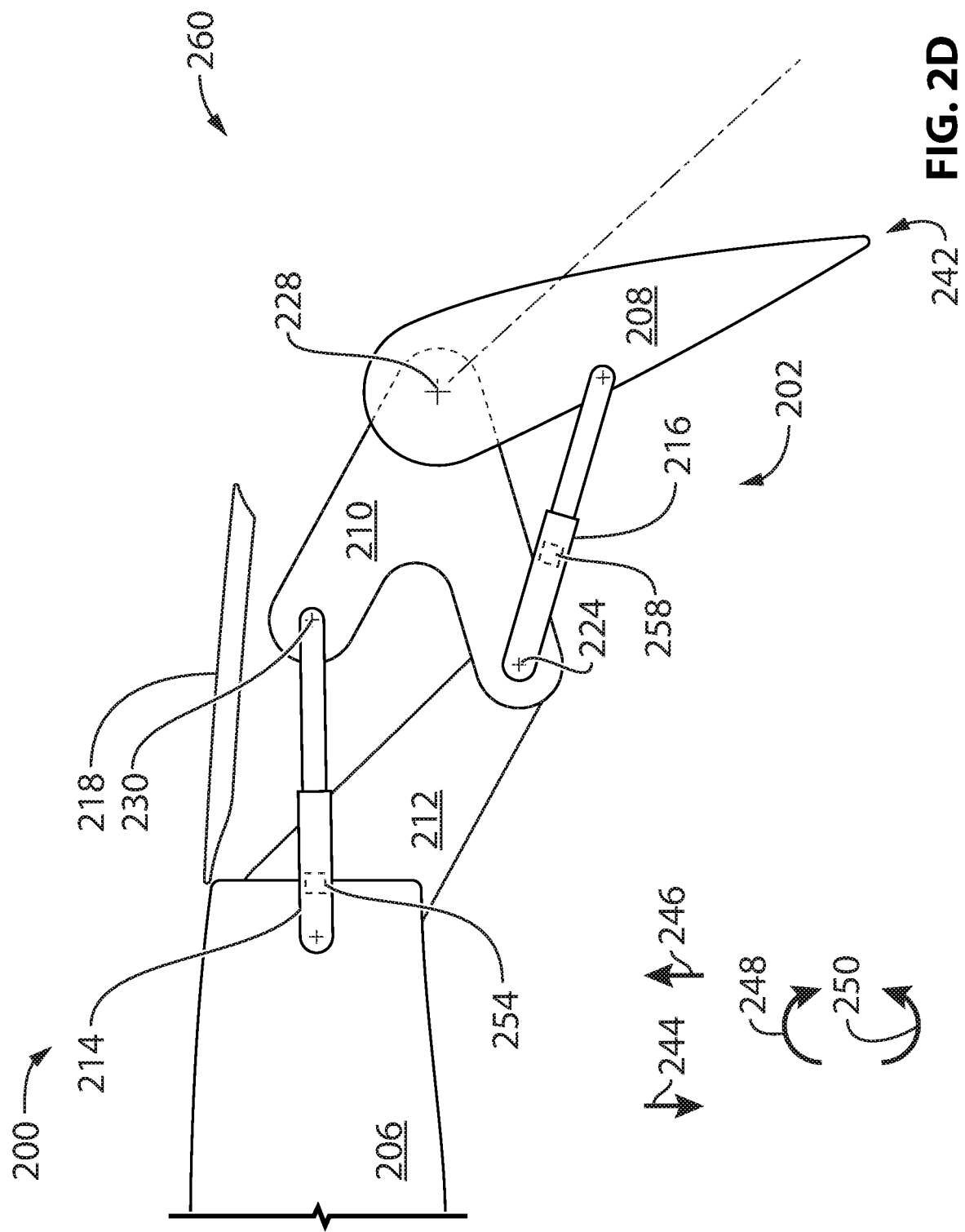
FIG. 2D illustrates the exemplary variable camber system of FIG. 2A in a fourth position.

As will be discussed below, FIGS. 2B-2D illustrate the variable-camber flap system 202 in different states or positions determined by the length of the first and second actuators 214, 216. These positions may be associated with particular flight situations. For example, the differing flap 208 positions illustrated among FIGS. 2A and 2C may be associated with high speed situations. Similarly, the differing flap 208 positions illustrated among FIGS. 2B and 2D may be associated with high-lift situations such as those encountered during takeoff and landing.

Referring now to FIG. 2B, the variable-camber flap system 202 of FIG. 2A is shown in a second position 252 after the first actuator 214 has expanded. A drive unit, such as a first electric motor 254, may control or drive the first actuator 214 to lengthen. Accordingly, the flap bracket 210 and the flap 208 have changed position relative to the position shown in FIG. 2A. In other words, the first electric motor 254 causes the first actuator 214 to drive rotation of both the flap 208 and the flap bracket 210 about the first pivot point 224 as the flap 208 remains stationary relative to the flap bracket 210.

It is noted that in other examples not shown, the first electric motor 254 can be placed somewhere else on the aircraft. Further, drive units other than electric motors may be employed.

With continued reference to FIG. 2B, since the flap bracket 210 is coupled to the wing bracket 212 at the first pivot point 224, expansion of the first actuator 214 causes both the flap bracket 210 and the flap 208 to rotate around the first pivot point 224 in the clockwise direction 248 (from the perspective of FIG. 2B). As such, the trailing edge 242 of the flap 208 is moved in the downward direction 244. It is noted that expansion of the first actuator 214 causes both the flap 208 and flap bracket 210 to rotate relative to the wing bracket 212. Further expansion of the first actuator 214 would cause the flap bracket 210 and flap 208 to continue to move in the clockwise direction 248, thus moving the trailing edge 242 of the flap 208 in a further downward direction 244. Using the first actuator 214 for downward flap control could be carried out for a variety of reasons. For example, during flight takeoff, extending the flap 208 in the downward direction 244 helps increase lift.

Instead of using the first actuator 214 to extend the flap 208 in the downward direction 244, the first electric motor 254 can be driven to cause the first actuator 214 to contract. Contraction of the first actuator 214 causes the flap 208 and flap bracket 210 to rotate in a counterclockwise direction 250 (from the perspective of FIG. 2B) relative to the wing bracket 212. As such, contraction of the first actuator 214 causes the trailing edge 242 of the flap 208 to move in the upward direction 246. Moving the flap 208 in the upward direction 246 may be carried out to decrease lift, or change the lift distribution across the wing span.

With reference now to FIG. 2C, the variable-camber flap system 202 of FIG. 2A is shown in a third position 256, where the first actuator and second actuators 214, 216 are contracted. In other words, the first actuator 214 is shown in the state illustrated in FIG. 2A, while the second actuator 216 is in a different contracted state. A drive unit, such as a second electric motor 258, may drive or control the second actuator 216, causing it to contract. Accordingly, the flap 208 changes position relative to the flap bracket 210. In other words, the contraction of the second actuator 216 causes the flap to rotate about the second pivot point 228 in the clockwise direction 248, thus causing the trailing edge 242 to move in the downward direction 244.

The second actuator 216 may be employed to carry out "fine-tuned" adjustments. For example, with the first actuator 214 contracted as shown in FIG. 2C, the second actuator 216 could be expanded or contracted to raise and lower the trailing edge 242 for fine-tuned adjustments in high speed cruising scenarios. Further, though span load on the spoiler 218 may need to be relieved, the spoiler 218 may not need to be repositioned.

For example, comparing FIG. 2A to FIG. 2C, it is shown that the spoiler 218 has not changed position, though there was a change in the rotation of the flap 208. These varying flap 208 positions may be associated with high speed lift situations. Due to the shape of the flap 208, the flap 208 can rotate relative to the flap bracket 210 while the spoiler 218 remains substantially stationary.

With reference now to FIG. 2D, the variable-camber flap system 202 of FIG. 2A is shown in a fourth position 260 after the first actuator 214 is expanded and the second actuator 216 is contracted.

Since the flap 208 is coupled to the flap bracket 210 at the second pivot point 228 of the flap bracket 210, contraction of the second actuator 216 causes the flap 208 to rotate around the second pivot point 228 in the clockwise direction 248. As such, the flap 208 rotates or changes position relative to the flap bracket 210 and the trailing edge 242 moves in a further downward direction 244. It is noted that the second pivot point 228 falls within the flap 208.

Still referring to FIG. 2D, further positioning (or repositioning) of the flap 208 can be carried out by causing the first actuator 214 and/or the second actuator 216 to either further contract or expand. For example, the second electric motor 258 can cause the second actuator 216 to: i) further contract so that the flap 208 continues to move in the clockwise direction 248 around the second pivot point 228 or ii) expand to move the flap 208 in the counterclockwise direction 250 around the second pivot point 228. That is, the second electric motor 258 causes the second actuator 216 to drive the rotation of the flap 208 about the second pivot point 228 as the flap bracket 210 remains stationary relative to the wing bracket 212.

With regard to the placement of the second electric motor 258, since the second electric motor 258 is placed remotely from the passenger cabin (e.g., passenger cabin 102 of FIG. 1) in the vicinity of the wing bracket 212 (or alternatively the wing portion 206) of FIG. 2D, cabin noise that can be caused by adjusting the flap 208 is avoided or at least reduced.

It is noted that the differing positions 252, 260 shown among FIGS. 2B and 2D can be associated with high-lift situations such as during takeoff and landing.

Referring to both FIGS. 2C and 2D, it is noted that when the variable-camber flap system 202 moved from the second position 256 of FIG. 2C to the third position 260 of FIG. 2D, the spoiler 218 did not change position. That is, when the second actuator 216 drives position adjustment of the flap 208 relative to the flap bracket 210, the spoiler 218 can remain in a stationary position during the position adjustment. Once again, due to the possibility of rotating the flap around the internal hinge 228, and due to the shape of the leading flap edge 314, the flap 208 can move relative to the flap bracket 210 in such a manner that does not require the spoiler 218 to be repositioned.

It is noted, however, that in other examples the spoiler 218 can be repositioned.

As shown in FIGS. 2A-2D and discussed above, because of the configuration of the variable-camber system 202, complexities are reduced since gear boxes, clutches, and additional PDUs are avoided.

Figure 3A:
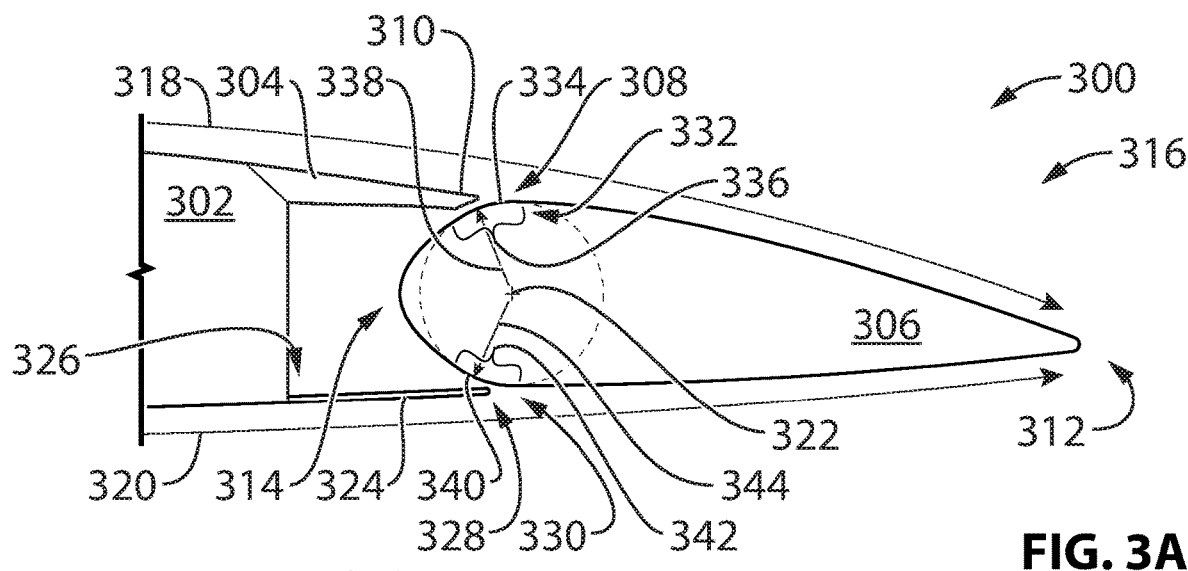
FIG. 3A illustrates an exemplary spoiler flap system in a neutral position.

With reference now to FIG. 3A, an additional feature of the spoiler flap system 300 is shown, that can be employed with the variable camber systems discussed above, for high-speed variable-camber applications. The spoiler flap system 300 is coupled to a wing 302 and includes a spoiler 304 and a flap 306, where there is a spoiler gap 308 between a trailing spoiler edge 310 of the spoiler 304 and the flap 306. The flap 306 has a trailing flap edge 312 and a leading flap edge 314. The flap 306 is shown in a neutral position 316. That is, the flap 306 is in a position 316 where it does not interfere with a natural top or upper surface contour 318 or a natural bottom or lower surface contour 320 of the wing 302.

The flap 306 has an axis of rotation 322 that passes therethrough. Further, the trailing spoiler edge 310 of the spoiler 304 is positioned above the axis of rotation 322 of the flap 306.

The system 300 may also include a bent-up trailing edge (BUTE) door 324 below the spoiler 304. The BUTE door 324 has a windward BUTE door end 326 and a trailing BUTE door end 328. A BUTE door gap 330 is shown between the trailing BUTE door end 328 and the flap 306.

A top portion 332 of the flap 306, above the axis of rotation 322, has a first semi-circular shape 334 that follows the path of a circle with a range 336. The center of this first semi-circular shape 334 coincides with the axis of rotation 322. In other words, a radius (R1) 338 of the first semi-circular shape 334 originates from the axis of rotation 322.

If a BUTE door is employed (e.g., BUTE door 324), the flap 306 surface may also have a second semi-circular shape 340 at a location between the BUTE door 324 and the axis of rotation 322. This second semi-circular shape 340 falls within a second range 342. The center of this second semi-circular shape 340 also coincides with the axis of rotation 322 of the flap 306. As such, a radius (R2) 344 of the second semi-circular shape 340 originates from the axis of rotation 322.

It is noted that R1 338 and R2 344 may or may not be equal to each other. That is, R1 338 may be less than, greater than, or equal to R2 344.

Figure 3B:
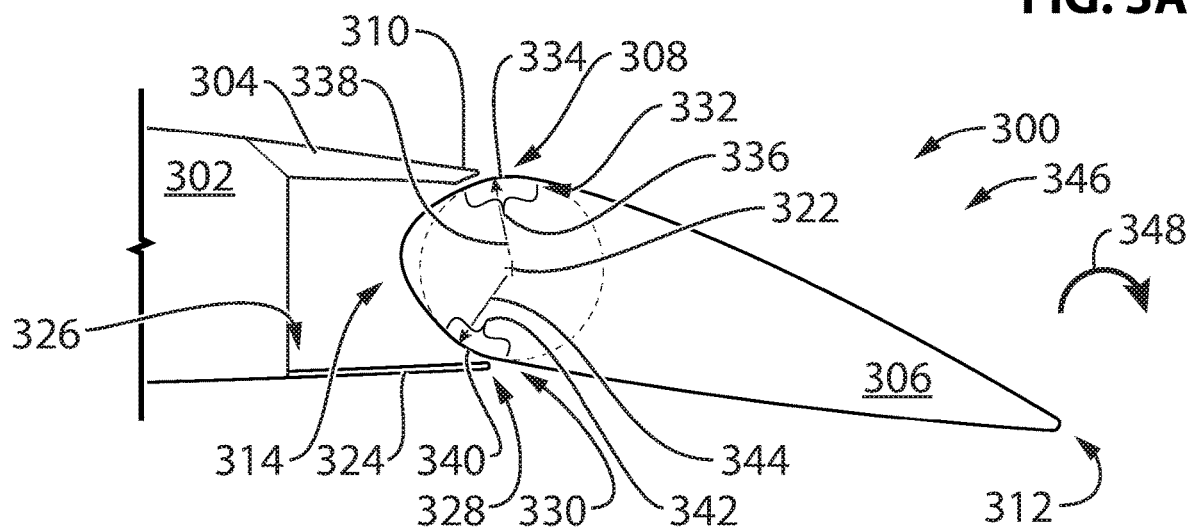
FIG. 3B illustrates the exemplary spoiler flap system of FIG. 3A in a second position.

Referring now to FIG. 3B, the spoiler flap system 300 of FIG. 3A is shown with the flap 306 in a second position 346. That is, the flap 306 has rotated in a clockwise direction 348 about the axis of rotation 322 from its neutral position 316 of FIG. 3A to the second position 346 of FIG. 3B.

As shown in the illustrations of FIGS. 3A and 3B, the position of the spoiler 304 does not change as the position (i.e., the neutral and second positions 316, 346) of the flap 306 changes. Further, the spoiler gap 308 between the trailing edge 310 of the spoiler 304 and the flap 306 also does not substantially change as the flap 306 moves from the neutral position 316 to the second position 346 (i.e., when the trailing edge 312 of the flap 306 is rotated down (clockwise 348)). As such, contact between the spoiler 304 and the flap 306 is avoided. Likewise, the position of the BUTE door 324 and the BUTE door gap 330 remains substantially unchanged as the flap 306 moves from the neutral position 316 to the second position 346.

Accordingly, due to the first and semi-circular flap shapes 334, 340, the flap 306 can move from the neutral position 316 to the second position 346 without having to reposition either the spoiler 304 or the BUTE door 324. In other words, drive units do not need to be employed to move the spoiler 304 or BUTE door 324 out of the way as the flap 306 rotates.

Figure 3C:
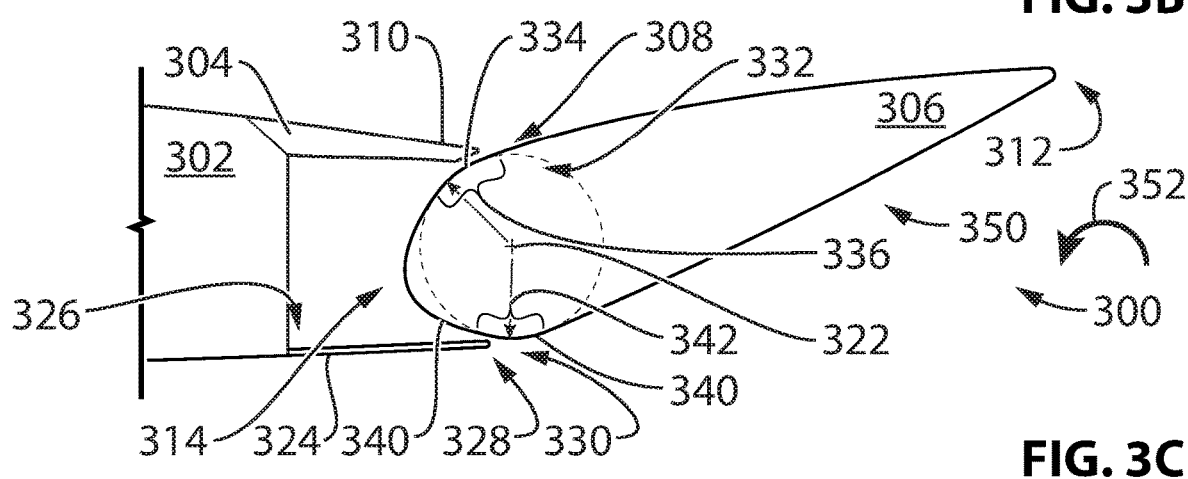
FIG. 3C illustrates the exemplary spoiler flap system of FIG. 3A in a third position.

Referring now to FIG. 3C, the spoiler flap system 300 of FIG. 3A is shown with the flap 306 in a third position 350. That is, the flap 306 in the neutral position 316 of FIG. 3A has rotated about its axis of rotation 322 in a counterclockwise direction 352 to the third position 350 of FIG. 3C. As such, the trailing edge 312 of the flap 306 is rotated up (counterclockwise 352) to, for example, reduce lift on the aircraft wing.

As illustrated in FIGS. 3A and 3C, the position of the spoiler 304 and the BUTE door 324 does not change as the flap 306 moves from the neutral position 316 to the third position 350. Further, the spoiler gap 308 and the BUTE door gap 330 remains substantially unchanged as the flap 306 moves from the neutral position 316 to the third position 350. Due to the first semi-circular shape 334 and the second semi-circular shape 340 of the flap 306, the flap can rotate from the neutral position 316 to the third position 350 without having to reposition either the spoiler 304 or the BUTE door 324.

Whether the flap 306 moves in the clockwise direction 348 (see FIG. 3B) or in the counterclockwise direction 352 (see FIG. 3C) within the range 336 of the first semi-circular surface shape 334, the spoiler gap 308 remains substantially the same so that the spoiler 304 need not be repositioned. Similarly, when a BUTE door 324 is employed, when the flap moves in the clockwise 348 direction or counter clockwise 352 direction within the second range 342 of the second semi-circular shape 340, the BUTE door gap 330 remains substantially unchanged so that the BUTE door 324 does not need to be repositioned.

The spoiler flap system 300 may be configured to allow the trailing edge 328 of the BUTE door 324 and the spoiler trailing edge 310 to remain substantially stationary while i) the flap trailing edge 312 rotates upward from a neutral position 316 over an upward range (e.g., plus five degrees) to reduce lift over the upward range and ii) the flap trailing edge 312 rotates downward from the neutral position 316 over a downward range (e.g., minus five degrees) to increases lift over the downward range.

While a BUTE door 324 is represented in FIGS. 3A-3C, in another example not shown, the BUTE door could simply be a fixed structure from the wing 302. Such structure could have substantially the same profile as the BUTE door 324, but remain fixed, rather than movable as BUTE doors generally function.

It is noted that in other examples not shown, there may not be a gap between the trailing spoiler edge 310 and the flap 306. That is, the trailing spoiler edge 310 (or a seal coupled thereto) may be in contact with the flap 306. In such an example, the trailing spoiler edge 310 may still remain stationary as the flap 310 rotates. Likewise, there may not be a gap between the trailing BUTE door end 328 and the flap 306, though the trailing BUTE door end or edge 328 may still remain stationary as the flap 306 rotates.

Figure 4:
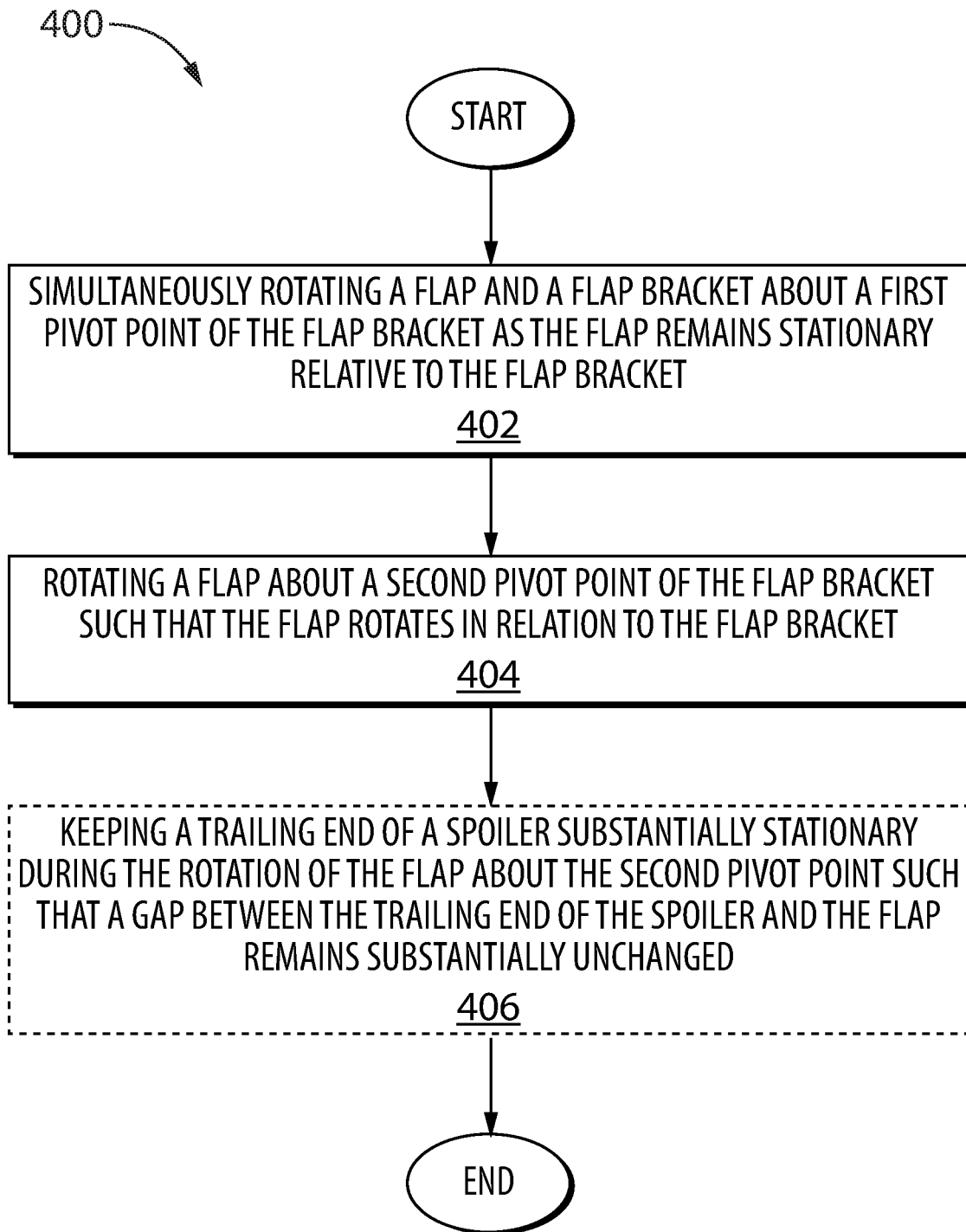
FIG. 4 is a flowchart setting forth an exemplary technique for manufacturing a variable camber system.

With reference now to FIG. 4, an exemplary technique 400 for manufacturing a variable camber system (e.g., variable-camber system 202 of FIGS. 2A-2D) for an aircraft wing is set forth.

As shown in FIG. 4, process control begins at BLOCK 402 where simultaneously rotating a flap and a flap bracket about a first pivot point of the flap bracket as the flap remains stationary relative to the flap bracket is set forth. According to an example not shown in FIG. 4, the simultaneous rotation of the flap and flap bracket may be caused by controlling a first linear actuator to drive the simultaneous rotation of the flap and the flap bracket about the first pivot point is set forth.

Referring back to technique 400, after BLOCK 402, process control then proceeds to BLOCK 404, where rotating a flap about a second pivot point of the flap bracket such that the flap rotates in relation to the flap bracket, is set forth. Rotation of the flap about the second pivot point occurs around an axis of rotation that passes through a windward end of the flap and the second pivot point.

Though not shown, according to another exemplary technique, rotation of the flap about a second pivot point may be carried out by controlling a second linear actuator to drive the rotation of the flap about the second pivot point of the flap bracket. It is noted that the second linear actuator is pivotably coupled to the first pivot point and pivotably coupled to the flap.

After BLOCK 404, process control proceeds to an END.

Alternatively, according to another example, before proceeding to the END the technique 400 may include keeping spoiler trailing edge substantially stationary during the rotation of the flap about the second pivot point such that a gap between the spoiler trailing edge and the flap remains substantially unchanged, as set forth ay BLOCK 406 (shown in phantom). It is noted that the gap lies between the spoiler trailing edge and the axis of rotation.

Technique 400 illustrates a sequence that includes first simultaneously rotating a flap and a flap bracket about a first pivot point of the flap bracket (BLOCK 402) and then rotating the flap about a second pivot point through the flap bracket (BLOCK 404). According to other examples, however, the actions of BLOCK 404 may occur before or at the same time as the actions of BLOCK 402.

Figure 5:
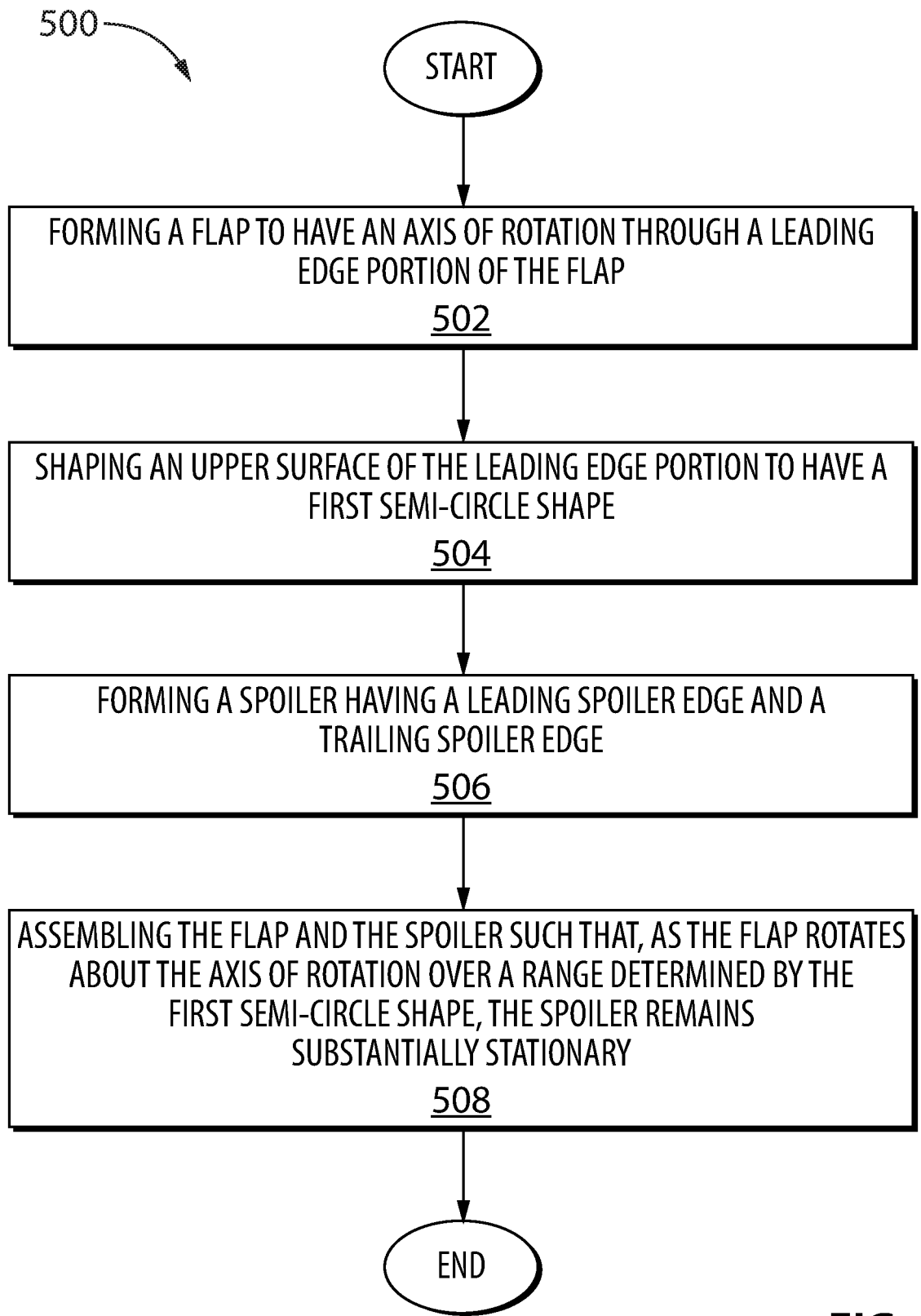
FIG. 5 is a flowchart setting forth another exemplary technique for manufacturing a variable camber system.

With reference now to FIG. 5, a flowchart depicting another exemplary technique 500 for manufacturing a variable camber system for an aircraft wing is set forth.

Process control begins at BLOCK 502, where forming a flap to have an axis of rotation through a leading edge portion of the flap is set forth. Next, at BLOCK 504 process control proceeds to shaping an upper surface of the leading edge portion to have a first semi-circle shape, where the first semi-circle shape has a first semi-circle radius that originates from the axis of rotation.

After shaping the upper surface of the flap, process control proceeds to BLOCK 506 where forming a spoiler having a leading edge and a trailing edge is carried out. Next, assembling the flap and the spoiler such that, as the flap rotates about the axis of rotation over a range determined by the first semi-circle shape, the spoiler remains substantially stationary is carried out at BLOCK 508. The gap remains unchanged as the flap rotates about the axis of rotation over a range determined by the first semi-circle shape.

Process control then proceeds to an END.

Technique 500 illustrates a sequence that includes, in part, first forming a flap to have an axis of rotation therethrough (BLOCK 502), shaping an upper surface of the leading edge portion to have a first semi-circle shape (BLOCK 504), and then forming a spoiler (BLOCK 506). The order of BLOCKS 502-506 may, however, be rearranged in any order desired.

While not shown, other exemplary techniques may also include the following: shaping a lower surface of the leading edge portion to have a second semi-circle shape such that the second semi-circle shape has a second semi-circle radius that originates from the axis of rotation; forming a bent-up trailing edge (BUTE) door having a leading edge and a trailing edge; and assembling the BUTE door such that an unchanging BUTE door gap remains between the second semi-circle shape and the trailing edge of the BUTE door as the flap rotates about the axis of rotation over a range determined by the second semi-circle shape. In some examples, as the flap rotates about the axis of rotation over the range determined by the first semi-circle shape an unchanging spoiler gap remains between the first semi-circle shape and the spoiler trailing edge. Further, the first semi-circle radius may be different than the second semi-circle radius. Further, the unchanging spoiler gap remains as the flap rotates upward from a neutral position by at least five degrees and the unchanging BUTE door gap remains as the flap rotates downward from the neutral position by at least five degrees.

With regard to FIGS. 1-5 and the processes, systems, methods, techniques, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary. Further, the use of terms such as "first," "second," "third," and the like that immediately precede an element(s) do not necessarily indicate sequence unless set forth otherwise, either explicitly or inferred through context.

The invention claimed is:

1. A variable camber system for an aircraft wing comprising:
   a wing bracket extending from a wing;
   a flap bracket pivotably coupled to the wing bracket; and
   a flap pivotably coupled to the flap bracket such that the flap pivots around an axis of rotation through the flap, wherein the variable camber system is configured to adjust position of both the flap and the flap bracket relative to the wing while maintaining position of the flap relative to the flap bracket, and wherein the variable camber system is also configured to adjust position of the flap relative to the flap bracket.

2. The variable camber system of claim 1 further comprising a first actuator coupled to at least one of the wing and the wing bracket and pivotably coupled to the flap bracket, the first actuator drives position adjustment of both the flap and the flap bracket relative to the wing.

3. The variable camber system of claim 2, the flap bracket comprising a first pivot region, a second pivot region, and a third pivot region, wherein the flap bracket pivotably coupled to the wing bracket is pivotably coupled to the wing bracket at the first pivot region, and wherein the flap pivotably coupled to the flap bracket is pivotably coupled to the flap bracket at the second pivot region, and wherein the first actuator pivotably coupled to the flap bracket is pivotably coupled to the flap bracket at the third pivot region.

4. The variable camber system of claim 2 further comprising a second actuator having a flap bracket end coupled to the flap bracket at the first pivot region and a flap end coupled to the flap, the second actuator drives position adjustment of the flap relative to the flap bracket.

5. The variable camber system of claim 4 further comprising an electric motor positioned remotely from an aircraft body having the aircraft wing, the electric motor configured to drive the second actuator.

6. The variable camber system of claim 4 wherein the first actuator is a first screw-jack type actuator and the second actuator is a second screw-jack type actuator.

7. The variable camber system of claim 4 wherein at least a portion of the flap above the axis of rotation has a semi-circular shape such that, when the second actuator drives position adjustment of the flap relative to the flap bracket, a trailing edge of a spoiler is configured to remain in a stationary position during the position adjustment.

8. A variable camber system for an aircraft wing comprising:
   a flap bracket having a first pivot point, a second pivot point, and a third pivot point;
   a wing bracket coupled to the flap bracket at the first pivot point, the wing bracket extending from the wing; and
   a flap pivotably coupled to the flap bracket at the second pivot point, wherein the variable camber system is configured to cause rotation of both the flap and the flap bracket about the first pivot point as the flap remains stationary relative to the flap bracket, and wherein the variable camber system is further configured to cause rotation of the flap about the second pivot point as the flap bracket remains stationary relative to the wing bracket.

9. The variable camber system of claim 8 wherein an axis of rotation passes through a leading edge the flap and the second pivot point such that flap rotates about the axis of rotation during the rotation of the flap about the second pivot point as the flap bracket remains stationary relative to the wing bracket.

10. The variable camber system of claim 9 wherein the wing bracket comprises a first end and a second end opposite the first end, the wing bracket is coupled to the aircraft wing at the first end and the flap bracket at the second end, the variable camber system further comprises a first actuator having a wing end and a flap bracket end opposite the wing end, the flap bracket end coupled to the flap bracket at the third pivot point and the wing end coupled to at least one of the wing and the wing bracket, and wherein the first actuator drives the rotation of both the flap and the flap bracket about the first pivot point as the flap remains stationary relative to the flap bracket.

11. The variable camber system of claim 10 further comprising a second actuator having a flap end and a flap bracket end opposite the flap end, the flap end coupled to the flap and the flap bracket end coupled to the flap bracket at the first pivot point, wherein the second actuator drives the rotation of the flap about the second pivot point as the flap bracket remains stationary relative to the wing bracket.

12. The variable camber system of claim 11 wherein the first actuator and the second actuator are each a linear-type actuator.

13. The variable camber system of claim 12 further comprising a first electric motor positioned remotely from a body of an aircraft having the aircraft wing, the first electric motor controls the first actuator driving rotation of both the flap and the flap bracket about the first pivot point as the flap remains stationary relative to the flap bracket.

14. The variable camber system of claim 13 further comprising a second electric motor positioned remotely from the body of the aircraft having the aircraft wing, the second electric motor controls the second actuator driving rotation of the flap about the second pivot point as the flap bracket remains stationary relative to the wing bracket.

15. The variable camber system of claim 8 further comprising a spoiler having a spoiler trailing edge, wherein the spoiler trailing edge is positioned above the axis of rotation of the flap such that there is a gap between the spoiler trailing edge and the flap, and wherein during rotation of the flap about the second pivot point the gap remains substantially unchanged.

16. A method of adjusting a variable camber system of an aircraft wing comprising:
  simultaneously rotating a flap and a flap bracket about a first pivot point of the flap bracket as the flap remains stationary relative to the flap bracket, the flap bracket being pivotally coupled to a wing bracket extending from a wing; and
  rotating a flap about a second pivot point of the flap bracket such that the flap rotates in relation to the flap bracket, wherein the rotating of the flap about the second pivot point occurs around an axis of rotation that passes through a leading flap edge and the second pivot point.

17. The method of claim 16 further comprising providing a first linear actuator to drive the simultaneous rotation of the flap and the flap bracket about the first pivot point.

18. The method of claim 17 further comprising providing a second linear actuator to drive rotation of the flap about the second pivot point through the flap bracket, wherein the second linear actuator is pivotably coupled to the first pivot point and pivotably coupled to the flap.

19. The method of claim 18 wherein one end of the first linear actuator is coupled to a third pivot point of the flap bracket and an opposite end is coupled to at least one of a wing and a wing bracket.

20. The method of claim 19 further comprising keeping a spoiler trailing edge substantially stationary during rotation of the flap about the second pivot point such that a gap between the spoiler trailing edge and the flap remains substantially unchanged, wherein the gap lies between the spoiler trailing edge and the axis of rotation.

* * * * *